(12) United States Patent
Covezzi et al.

(10) Patent No.: US 9,133,291 B2
(45) Date of Patent: Sep. 15, 2015

(54) MULTISTAGE PROCESS FOR THE POLYMERIZATION OF OLEFINS

(71) Applicant: Basell Polyolefine GmbH, Wesseling (DE)

(72) Inventors: Massimo Covezzi, Ferrara (IT); Giuseppe Penzo, Ferrara (IT); Gabriele Mei, Ferrara (IT); Giulia Mei, Ferrara (IT); Pietro Baita, Ferrara (IT); Gerhardus Meier, Frankfurt (DE); Antonio De Lucia, Amsterdam (NL); Ulf Schueller, Frankfurt (DE); Gianpiero Ferraro, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 14/362,842

(22) PCT Filed: Dec. 4, 2012

(86) PCT No.: PCT/EP2012/074324
§ 371 (c)(1),
(2) Date: Jun. 4, 2014

(87) PCT Pub. No.: WO2013/083548
PCT Pub. Date: Jun. 13, 2013

(65) Prior Publication Data
US 2014/0309384 A1    Oct. 16, 2014

Related U.S. Application Data

(60) Provisional application No. 61/569,524, filed on Dec. 12, 2011.

(30) Foreign Application Priority Data

Dec. 6, 2011  (EP) .................... 11192070

(51) Int. Cl.
| | |
|---|---|
| C08F 2/00 | (2006.01) |
| B01J 19/18 | (2006.01) |
| C08F 110/02 | (2006.01) |
| C08F 10/02 | (2006.01) |
| C08F 2/34 | (2006.01) |
| C08F 10/00 | (2006.01) |

(52) U.S. Cl.
CPC ............... C08F 110/02 (2013.01); C08F 2/001 (2013.01); C08F 2/34 (2013.01); C08F 10/00 (2013.01); C08F 10/02 (2013.01)

(58) Field of Classification Search
CPC .......... C08F 110/02; C08F 10/00; C08F 2/34; C08F 2/001; C08F 10/02; C08F 2/00; C08F 2/01; C08F 2500/12; C08F 2500/18; C08F 2500/24
USPC ............................................. 526/65; 422/135
See application file for complete search history.

(56) References Cited

U.S. PATENT DOCUMENTS

| | | |
|---|---|---|
| 4,495,337 A | 1/1985 | Raufast |
| 5,728,353 A | 3/1998 | Govoni et al. |

FOREIGN PATENT DOCUMENTS

| | | |
|---|---|---|
| RU | 2126015 C1 | 2/1999 |
| WO | WO2007/071527 A1 * | 6/2007 |
| WO | WO2008/074632 A1 | 6/2008 |

OTHER PUBLICATIONS

PCT International Search Report & Written Opinion mailed Jun. 27, 2013, for PCT/EP2012/074324.

*Primary Examiner* — William Cheung

(57) ABSTRACT

Process for transferring polyolefin particles from a first gas-phase polymerization reactor to a second gas-phase polymerization reactor in a multistage polymerization of olefins carried out in at least two serially connected gas-phase polymerization reactors,
wherein the first gas-phase reactor is a fluidized-bed reactor comprising a gas distribution grid and a settling pipe, which is integrated with its upper opening into the distribution grid and contains a bed of polyolefin particles which moves from top to bottom of the settling pipe,
the process comprising the steps of
introducing a fluid into the settling pipe in an amount that an upward stream of the fluid is induced in the bed of polyolefin particles above the fluid introduction point;
withdrawing polyolefin particles from the lower end of the settling pipe; and
transferring the withdrawn polyolefin particles into the second gas-phase polymerization reactor,
process for polymerizing olefins comprising such a process for transferring polyolefin particles, reactor suitable as first gas-phase polymerization reactor in the process for polymerizing olefins and process for discharging polyolefin particles from a fluidized-bed reactor.

9 Claims, 2 Drawing Sheets

MULTISTAGE PROCESS FOR THE POLYMERIZATION OF OLEFINS

This application is the U.S. National Phase of PCT International Application PCT/EP2012/074324, filed Dec. 4, 2012, claiming benefit of priority to European Patent Application No. 11192070.8, filed Dec. 6, 2011, and claiming benefit of priority under 35 U.S.C. §119(e) to U.S. Provisional Application No. 61/569,524, filed Dec. 12, 2011, the contents of which are incorporated herein by reference in their entirety.

FIELD OF THE INVENTION

The present invention relates to a process for transferring polyolefin particles from a first gas-phase polymerization reactor to a second gas-phase polymerization reactor in a multistage polymerization of olefins carried out in at least two serially connected gas-phase polymerization reactors. It further relates to a process for polymerizing olefins comprising such a process for transferring polyolefin particles. Moreover, the invention relates to a reactor suitable as first gas-phase polymerization reactor in the process for polymerizing olefins and to a process for discharging polyolefin particles from a fluidized-bed reactor.

BACKGROUND OF THE INVENTION

The polymerization of olefins in two or more serially connected gas-phase reactors allows to produce olefin polymers with improved properties and/or to simplify the existing production processes. This is made possible by choosing polymerization conditions in the second reactor or subsequent reactors different from the reaction conditions existing in the first polymerization reactor. Typically, olefin polymers grow on particles including a catalyst component, which continues to exert a catalytic activity even when the polymer particles are transferred to a successive gas-phase reactor. The polymer resulting from the first gas-phase reactor is transferred to the second gas-phase reactor, where polymerization is continued under different conditions. Therefore, different fractions of polymer can grow on the same particle by maintaining a different composition of the gas-phase mixture in each reactor.

Examples of polymers that may be produced by a multistage gas-phase process include bimodal or multimodal polymers obtained by maintaining a different concentration of a chain terminator, such as hydrogen, in each reactor; and random or heterophasic copolymers obtained by polymerizing different (co)monomers in each reactor. The term "heterophasic copolymer" includes also in-reactor polymer blends.

The transfer of the polymer from one gas-phase reactor to another one is a critical step of a multistage polymerization process. A direct discharge of polymer from an upstream reactor to a downstream reactor does not allow maintaining really different polymerization conditions in the downstream reactor, due to the substantial amount of gases and dissolved hydrocarbons associated to the polymer transferred to the downstream reactor.

A solution that has been proposed for a long time is degassing the solid polymer discharged from the upstream reactor, then subjecting the polymer to a compression stage and transferring it to the downstream polymerization reactor. A process according to that solution is disclosed in EP 192 427 A1, which describes a process in which the compression stage is performed by means of the reaction gas mixture of the downstream reactor at a temperature lower by at least 20° C. than the temperature of the downstream reactor. WO 2008/058839 A2 discloses a process for the multistage polymerization of olefins which allows continuously discharging the polymer and the gas reaction mixture from the upstream reactor into a transfer device and continuously feeding polymer from the transfer device to a downstream reactor by using a transfer device comprising a separation chamber, in which the gas reaction mixture is removed from the polymer, and at least a couple of lock hoppers, which work intermittently in parallel.

EP 050 013 A2 refers to a process for polymerizing an olefin in the gaseous phase in a multiplicity of steps in at least two independent polymerization zones connected to each other by a transfer passage by which a gaseous stream containing the polymer obtained in a first polymerization zone is transferred into a second polymerization zone. The process is characterized in that an inert gas zone is provided in the transfer passage and at least a part of the gas components of the gaseous stream containing the polymer is replaced by an inert gas.

These processes have the disadvantage that they comprise a pressure reduction step by which the reaction gas, which was removed with the polymer from the first reactor, is separated from the polymer particles. However, for recycling the reaction gas to the upstream reactor it is needed to compress this reaction gas again. This requires specific equipment and makes the process expensive and energy-intensive.

EP 1 040 868 A2 discloses a method of multistage gas phase polymerization in which a polymerization of a feed gas mixture at least containing ethylene, an alpha-olefin and hydrogen is carried out in an upstream arranged fluidized-bed reactor. The polymer powder taken up from the upstream arranged fluidized-bed reactor is treated with a gas to lower the content of alpha-olefin gas and hydrogen gas in the polymers powder and then introduced into a downstream arranged reactor.

U.S. Pat. No. 7,465,772 B2 describes a method for continuously polymerizing olefin(s) in a plurality of serially-disposed gas-phase polymerization reactors in which an upstream and a downstream reactor being adjacent to each other are connected via a gas exchange vessel containing a gas distributor plate. The polymer powder transferred from the upstream reactor is temporarily accumulated in the gas exchange chamber and the first gas which has been introduced from the upstream reactor together with the polymer powder and which exists in the polymer powder is exchanged at least partly with a second gas which is fed into the gas exchange vessel. The polymer powder is then transferred intermittently from the gas exchange vessel to the downstream reactor.

US 2010/0029867 A1 discloses a gas-phase polymerization apparatus comprising a gas-phase polymerization reactor and a gas separator which is connected to the gas-phase polymerization reactor by a transfer tube. A mixture of a polymer powder and a gas is introduced into the gas separator in which the gas contained in the mixture is replaced by a replacement gas. However, the disclosed set-up requires beside the reactor an additional pressurized vessel, the gas separator, and has the risk that polymer powder gets stuck in the transfer tube.

WO 2007/071527 A1 describes a method of discharging polymer particles from a fluidized-bed reactor in which the polymer is continuously recycled in an outside circulation loop from the gas distribution grid to the upper region of the fluidized-bed reactor and the polymer is withdrawn from the circulation loop. WO 2008/074632 A1 discloses a gas distribution grid of a fluidized-bed reactor having the inlet of the discharge conduit been placed at the center of the distribution grid. The polymer particles discharged through this conduit are fed to the degassing and extruding facilities.

Thus, it was the object of the present invention to find a simple process for transferring polyolefin particles from a first gas-phase polymerization reactor to a second gas-phase polymerization reactor which not only reliably allows to prevent the transfer of the reaction gas mixture of the first gas-phase reactor to the second gas-phase reactor, but which process also facilitates continuous polymerizations in both the first and the second gas-phase polymerization reactor and which does not require a lot of machinery, i.e. can be implemented without high investment costs, and can be carried without the necessity of recompressing or recycling a larger amount of the reaction gas of the first gas-phase polymerization reaction, i.e. can be operated a low operational costs.

SUMMARY OF THE INVENTION

We found that this object is achieved by a process for transferring polyolefin particles from a first gas-phase polymerization reactor to a second gas-phase polymerization reactor in a multistage polymerization of olefins carried out in at least two serially connected gas-phase polymerization reactors, wherein the first gas-phase reactor is a fluidized-bed reactor comprising a gas distribution grid and a settling pipe, which is integrated with its upper opening into the distribution grid and contains a bed of polyolefin particles which moves from top to bottom of the settling pipe, the process comprising the steps of introducing a fluid into the settling pipe in an amount that an upward stream of the fluid is induced in the bed of polyolefin particles above the fluid introduction point;

withdrawing polyolefin particles from the lower end of the settling pipe; and transferring the withdrawn polyolefin particles into the second gas-phase polymerization reactor.

Furthermore, we have found a process for polymerizing olefins at temperatures of from 30° C. to 140° C. and pressures of from 1.0 MPa to 10 MPa in the presence of a polymerization catalyst in a multistage polymerization of olefins in at least two serially connected gas-phase polymerization reactors comprising such a process for transferring polyolefin particles. We also found a reactor for polymerizing olefins in a fluidized bed of polyolefin particles comprising a gas distribution grid, a velocity reduction zone and recycle gas line for transferring reaction gas from the top of the velocity reduction zone to a part of the reactor below the gas distribution grid, the recycle gas line being equipped with a compressor and a heat exchanger, wherein the reactor further comprises a settling pipe which is integrated with its upper opening into the distribution grid and which is equipped with an inlet for introducing a fluid into the settling pipe and we found a process for discharging polyolefin particles from such a fluidized-bed reactor.

BRIEF DESCRIPTION OF THE DRAWINGS

The features and advantages of the present invention can be better understood via the following description and the accompanying drawings where.

DETAILED DESCRIPTION OF THE INVENTION

Figure 1:
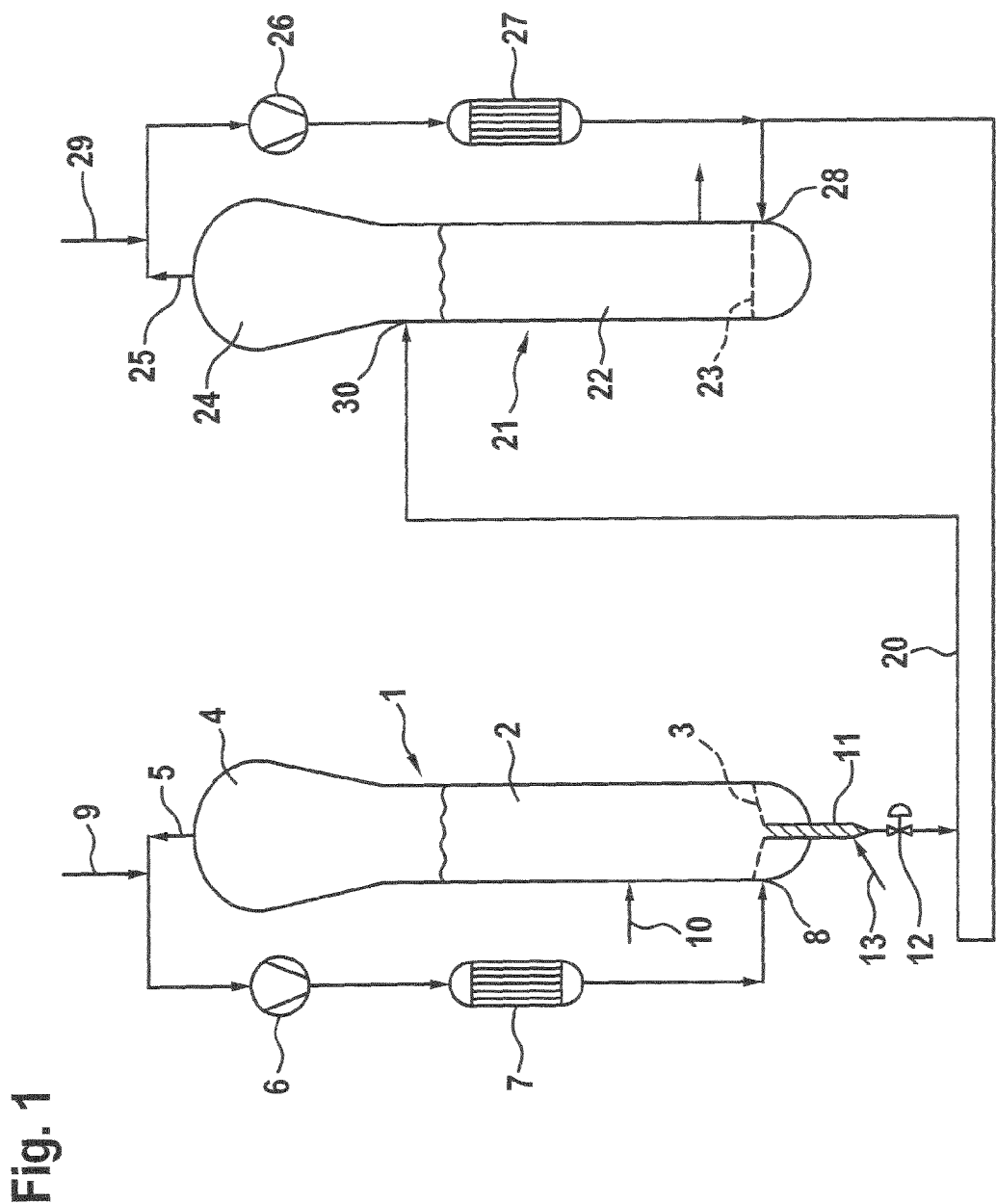
FIGS. 1 and 2 show schematically set-ups for a multistage gas-phase polymerization of olefins.

The present invention provides a process for transferring polyolefin particles from a first gas-phase polymerization reactor to a second gas-phase polymerization reactor in a multistage polymerization of olefins. Suitable olefins for such a polymerization are especially 1-olefins, i.e. hydrocarbons having terminal double bonds, without being restricted thereto. Suitable olefins monomers can however also be functionalized olefinically unsaturated compounds such as ester or amide derivatives of acrylic or methacrylic acid, for example acrylates, methacrylates, or acrylonitrile. Preference is given to nonpolar olefinic compounds, including aryl-substituted 1-olefins. Particularly preferred 1-olefins are linear or branched $C_2$-$C_{12}$-1-alkenes, in particular linear $C_2$-$C_{10}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and non-conjugated dienes such as 1,3-butadiene, 1,4-hexadiene or 1,7-octadiene or vinylaromatic compounds such as styrene or substituted styrene. It is also possible to polymerize mixtures of various 1-olefins. Suitable olefins also include ones in which the double bond is part of a cyclic structure which can have one or more ring systems. Examples are cyclopentene, norbornene, tetracyclododecene or methylnorbornene or dienes such as 5-ethylidene-2-norbornene, norbornadiene or ethylnorbornadiene. It is also possible to polymerize mixtures of two or more olefins.

The process is in particular suitable in the multistage homopolymerization or copolymerization of ethylene or propylene. As comonomers in ethylene polymerization, preference is given to using up to 40 wt.-% of $C_3$-$C_8$-1-alkenes, in particular 1-butene, 1-pentene, 1-hexene and/or 1-octene. Preferred comonomers in propylene polymerization are up to 40 wt.-% of ethylene and/or butene. Particular preference is given to a process in which ethylene is copolymerized with up to 20 wt.-% of 1-hexene and/or 1-butene.

The transfer of polyolefin particles according to the present invention takes places from one gas-phase reactor to another gas-phase reactor in a multistage polymerization of olefins, where the first gas-phase reactor is a fluidized-bed reactor comprising a gas distribution grid and a settling pipe, which is integrated with its upper opening into the distribution grid.

Fluidized-bed polymerization reactors are reactors in which the polymerization takes place in a bed of polymer particles which is maintained in a fluidized state by feeding in reaction gas at the lower end of a reactor, usually below a gas distribution grid having the function of dispensing the gas flow, and taking off the gas again at its upper end. The reaction gas is then returned to the lower end to the reactor via a recycle line equipped with a compressor and a heat exchanger. The circulated reaction gas is usually a mixture of the olefins to be polymerized, inert gases such as nitrogen and/or lower alkanes such as ethane, propane, butane, pentane or hexane and optionally a molecular weight regulator such as hydrogen. The use of nitrogen or propane as inert gas, if appropriate in combination with further lower alkanes, is preferred. The velocity of the reaction gas has to be sufficiently high firstly to fluidize the mixed bed of finely divided polymer present in the tube serving as polymerization zone and secondly to remove the heat of polymerization effectively. The polymerization can also be carried out in a condensing or super-condensing mode, in which part of the circulating reaction gas is cooled to below the dew point and returned to the reactor separately as liquid and gas-phase or together as two-phase mixture in order to make additional use of the enthalpy of vaporization for cooling the reaction gas.

In gas-phase fluidized-bed reactors, it is advisable to work at pressures of from 0.1 to 10 MPa, preferably from 0.5 to 8 MPa and in particular from 1.0 to 3 MPa. In addition, the cooling capacity depends on the temperature at which the polymerization in the fluidized bed is carried out. The process is advantageously carried out at temperatures of from 30 to 140° C., particularly preferably from 65 to 125° C., with temperatures in the upper part of this range being preferred for copolymers of relatively high density and temperatures in the lower part of this range being preferred for copolymers of lower density.

The polymerization of olefins can be carried out using all customary olefin polymerization catalysts. That means the polymerization can be carried out using Phillips catalysts based on chromium oxide, using titanium-based Ziegler- or Ziegler-Natta-catalysts, or using single-site catalysts. For the purposes of the present invention, single-site catalysts are catalysts based on chemically uniform transition metal coordination compounds. Particularly suitable single-site catalysts are those comprising bulky sigma- or pi-bonded organic ligands, e.g. catalysts based on mono-Cp complexes, catalysts based on bis-Cp complexes, which are commonly designated as metallocene catalysts, or catalysts based on late transition metal complexes, in particular iron-bisimine complexes. Furthermore, it is also possible to use mixtures of two or more of these catalysts for the polymerization of olefins. Such mixed catalysts are often designated as hybrid catalysts. The preparation and use of these catalysts for olefin polymerization are generally known.

Preferred catalysts are of the Ziegler type preferably comprising a compound of titanium or vanadium, a compound of magnesium and optionally a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are $TiBr_3$, $TiBr_4$, $TiCl_3$, $TiCl_4$, $Ti(OCH_3)Cl_3$, $Ti(OC_2H_5)Cl_3$, $Ti(O-i-C_3H_7)Cl_3$, $Ti(O-n-C_4H_9)C_{13}$, $Ti(OC_2H_5)Br_3$, $Ti(O-n-C_4H_9)Br_3$, $Ti(OCH_3)_2Cl_2$, $Ti(OC_2H_5)_2C_{12}$, $Ti(O-n-C_4H_9)_2C_{12}$, $Ti(OC_2H_5)_2Br_2$, $Ti(OCH_3)_3Cl$, $Ti(OC_2H_5)_3Cl$, $Ti(O-n-C_4H_9)_3Cl$, $Ti(OC_2H_5)_3Br$, $Ti(OCH_3)_4$, $Ti(OC_2H_5)_4$ or $Ti(O-n-C_4H_9)_4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides and in particular the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine and in particular chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides, $SiCl_4$ or $CCl_4$ and preferably chlorine or hydrogen chloride.

Examples of suitable, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di($C_1$-$C_{10}$-alkyl) magnesium compounds. Preferably, the Ziegler-Natta catalyst comprises a transition metal selected from titanium, zirconium, vanadium, chromium.

Catalysts of the Ziegler type are usually polymerized in the presence of a cocatalyst. Preferred cocatalysts are organometallic compounds of metals of groups 1, 2, 12, 13 or 14 of the Periodic Table of Elements, in particular organometallic compounds of metals of group 13 and especially organoaluminum compounds. Preferred cocatalysts are for example organometallic alkyls, organometallic alkoxides, or organometallic halides.

Preferred organometallic compounds comprise lithium alkyls, magnesium or zinc alkyls, magnesium alkyl halides, aluminum alkyls, silicon alkyls, silicon alkoxides and silicon alkyl halides. More preferably, the organometallic compounds comprise aluminum alkyls and magnesium alkyls. Still more preferably, the organometallic compounds comprise aluminum alkyls, preferably trialkylaluminum compounds. Preferably, the aluminum alkyls comprise, for example, trimethylaluminum, triethylaluminum, tri-isobutylaluminum, tri-n-hexylaluminum and the like.

The polyolefin grows in the form of polymer particles having a more or less regular morphology and size, depending on the catalyst morphology and size, and on polymerization conditions. Depending on the catalyst used, the polyolefin particles usually have a mean diameter of from a few hundred to a few thousand micrometers. In the case of chromium catalysts, the mean particle diameter is usually from about 400 to about 1600 μm, and in the case of Ziegler-Natta catalysts the mean particle diameter is usually from about 600 to about 3000 μm.

The fluidized-bed reactor, from which the polyolefin particles are transferred to the second gas-phase reactor, is characterized in being equipped with a settling pipe for discharging the polyolefin particles. The settling pipe is positioned in a way that its upper opening is integrated into the distribution grid. Preferably the settling pipe is arranged substantially vertically where substantially vertically means that the angle between the longitudinal direction of the settling pipe and the vertical is not more than 40 degrees and preferably not more than 10 degrees. In a preferred embodiment of the present invention the lower end of the settling pipe tapers conically to prevent a dead zone where polymer particles could get stuck.

Polyolefin particles coming from the fluidized bed fall due to gravity into the settling pipe and form therein a densified bed of polyolefin particles. At the lower end of the settling pipe, polyolefin particles are withdrawn and transferred to the second gas-phase reactor. Consequently, the polyolefin particles within the settling pipe move downwards from top to bottom of the settling pipe driven by gravity. Preferably, the polyolefin particles move as plug flow from top to bottom of the settling pipe.

At its lower end, the settling pipe is provided with a discharge valve through which the polyolefins particles are withdrawn from the settling pipe. Suitable discharge valves are, for example, segmental ball or ball valves or rotary plug valves. Preferably the discharge valve is a segmental ball valve. By regulating this valve, the discharge flow is controlled which allows keeping the bed level inside the fluidized-bed reactor constant. The discharge of the polyolefin particles can be carried out continuously or intermittently. Preferably the polyolefin particles are continuously withdrawn from the settling pipe. In case the discharge of the polyolefin particles is carried out intermittently, the opening intervals of the valve are selected in a way that the continuous polymerization in the fluidized-bed reactor is not or at least only minimally disturbed. A fluid is fed into the settling pipe in an amount that an upward stream of the fluid is induced in the bed of polyolefin particles above the fluid introduction point. Preferably the fluid is introduced into the lower third of the settling pipe and especially at a position near the lower end of the settling pipe. It is also possible to feed the fluid at more than one position into the settling pipe. Preferably the fluid is fed in a way that it is distributed over the whole cross-section of the settling pipe in a region above the fluid introduction point. It can be possible to achieved such a distribution with simple means for adding a fluid; it is however also possible to utilize a gas distributor. The fed fluid can be a gas or can be a liquid, which evaporates under the conditions in the settling pipe, or can be a mixture of a gas and such a liquid. Preferably the fluid fed into the settling pipe is a gas. Accordingly, the introduced fluid replaces the reaction gas of the fluidized-bed reactor and acts as barrier, which prevents the reaction gas of the first gas-phase polymerization reactor from being transferred to the second polymerization reactor. The introduced fluid is preferably a component of the reaction gas mixtures of both the first and the second gas-phase polymerization reactor. It is preferably an inert component and especially preferred a saturated hydrocarbon such as propane. Preferably the amount of fed fluid is regulated in a way that an effective upward stream of the fluid in the bed of polyolefin particles above the fluid introduction point is induced and reliably sustained. It is however further preferred that a not too high amount of fluid is introduced since on the one hand an expansion of the bed in the settling pipe, which could transport polyolefins back into the fluidized-bed reactor, should be avoided and, on the other hand, the higher the amount of added inert is the higher is either the dilution of the reaction gas with the fluid or the need for purging a part of reaction gas.

The polyolefin particles withdrawn from the lower end of the settling pipe are transferred to the second gas-phase reactor. This second gas-phase reactor can be of any type of commonly used gas-phase reactors for preparing polyolefins such as horizontally or vertically stirred gas-phase reactors, fluidized-bed reactors or multizone circulating reactors, in which two polymerization zones are linked to one another and the polymer is passed alternately a plurality of times through these two zones. Preferably the second gas-phase reactor is either a fluidized-bed gas reactor or a multizone circulating reactor. Preferred multizone circulating reactors are, for example, described in WO 97/04015 and WO 00/02929 and have two interconnected polymerization zones, a riser, in which the growing polymer particles flow upward under fast fluidization or transport conditions and a downcomer, in which the growing polymer particles flow in a densified form under the action of gravity. The polymer particles leaving the riser enter the downcomer riser and the polymer particles leaving the downcomer are reintroduced into the riser, thus establishing a circulation of polymer between the two polymerization zones. Such multizone circulating reactors also allow polymerizing in both polymerization zones under different polymerization conditions.

The transfer of polyolefin particles according to the present invention takes places from one gas-phase reactor to another gas-phase reactor in a multistage polymerization of olefins. The multistage polymerization of olefins may comprise however also further, additional polymerization stages carried out in additional reactors. These additional polymerization reactors can be any kind of low-pressure polymerization reactors such as gas-phase reactors or suspension reactors. If the multistage polymerization of olefins includes polymerization in suspension, the suspension polymerization is preferably carried out upstream of the gas-phase polymerization. Suitable reactors for carrying out such a suspension polymerization are for example loop reactors or stirred tank reactors. Suitable suspension media are inter alia inert hydrocarbons such as isobutane or mixtures of hydrocarbons or else the monomers themselves. Such additional polymerization stages in suspension may also include a pre-polymerization stage. If the multistage polymerization of olefins comprises additional polymerization stages carried out in gas-phase the additional gas-phase polymerization reactors can be any type of gas-phase reactors like horizontally or vertically stirred gas-phase reactors, fluidized-bed reactors or multizone circulating reactors. Such additional gas-phase polymerization reactors may be arranged upstream or downstream the first and the second gas-phase polymerization reactor of the multistage polymerization of olefins. In a preferred embodiment of such a multistage polymerization in more than two gas-phase polymerization reactors all gas-phase reactors, which are not the last gas-phase reactor of the series, are fluidized-bed reactor according the present invention comprising a gas distribution grid and a settling pipe, which is integrated with its upper opening into the distribution grid.

FIG. 1 shows schematically the set-up of two serially connected fluidized-bed reactors for carrying out the process of the present invention, i.e. both gas-phase reactors for polymerizing olefins are fluidized-bed reactors.

The first gas-phase reactor, fluidized-bed reactor (1), comprises a fluidized bed (2) of polyolefin particles, a gas distribution grid (3) and a velocity reduction zone (4). The velocity reduction zone (4) is generally of increased diameter compared to the diameter of the fluidized-bed portion of the reactor. The polyolefin bed is kept in a fluidization state by an upwardly flow of gas fed through the gas distribution grid (3) placed at the bottom portion of the reactor (1). The gaseous stream of the reaction gas leaving the top of the velocity reduction zone (4) via recycle line (5) is compressed by compressor (6), transferred to a heat exchanger (7), in which it is cooled, and then recycled to the bottom of the fluidized-bed reactor (1) at a point below the gas distribution grid (3) at position (8). The recycle gas can, if appropriate, be cooled to below the dew point of one or more of the recycle gas components in the heat exchanger so as to operate the reactor with condensed material, i.e. in the condensing mode. The recycle gas can comprise, besides unreacted monomers, also inert condensable gases, such as alkanes, as well as inert non-condensable gases, such as nitrogen. Make-up monomers, molecular weight regulators, and optional inert gases can be fed into the reactor (1) at various positions, for example via line (9) upstream of the compressor (6); this non-limiting the scope of the invention. Generally, the catalyst is fed into the reactor (1) via a line (10) that is preferably placed in the lower part of the fluidized bed (2).

The fluidized-bed reactor (1) further comprises a settling pipe (11), which is integrated with its upper opening into the gas distribution grid (3) and is preferably arranged substantially vertical. The settling pipe (11) may be made of a uniform diameter, or preferably comprises more sections having decreasing diameters in the downward direction. The gas distribution grid (3) may be flat, but preferably is endowed with a cone shape in such a way that its downward inclination towards the settling pipe (11) fosters the entry of the polyolefin particle into the settling pipe (11) due to gravity. The upper opening of the settling pipe (11) is preferably located in a central position with respect to the gas distribution grid (3).

During operation of fluidized-bed reactor (1) the settling pipe (11) contains a bed of polyolefin particles which moves from top to bottom of the settling pipe. The polyolefin particles enter the settling pipe (11) through the upper opening and they are withdrawn preferably continuously through discharge valve (12), which is preferably a segmental ball valve.

A fluid is fed via line (13) into the settling pipe (11), preferably at a position near the lower end of the settling pipe in an amount that an upward stream of the fluid is induced in the bed of polyolefin particles. The introduced fluid is preferably an inert component and especially preferred a saturated hydrocarbon such as propane. The propane is preferably taken from a gas recovery unit (not shown) in which purified propane is obtained by distillation or separation from off-gas of the polymerization reactors.

The second gas-phase reactor, fluidized-bed reactor (21) is operated like the fluidized-bed reactor (1). It comprises a fluidized bed (22) of polyolefin particles, a gas distribution grid (23) and a velocity reduction zone (24). The polyolefin bed is kept in a fluidization state by an upwardly flow of gas fed through the gas distribution grid (23). The gaseous stream of the reaction gas leaving the top of the velocity reduction zone (24) via recycle line (25) is compressed by compressor (26), transferred to a heat exchanger (27), in which it is cooled, and then recycled to the bottom of the fluidized-bed reactor (21) at a point below the gas distribution grid (23) at position (28). Make-up monomers, molecular weight regulators, and optional inert gases can be fed into the reactor (21) for example via line (29) upstream of the compressor (26).

Discharge valve (12) is arranged above a line (20) which branches off the recycle gas line (25) downstream of the heat exchanger (27). Line (20) carries a part of the recycle gas of the second gas-phase reactor (21). The polyolefin particles having passed discharge valve (12) enter the line (20) and are transported to the second gas-phase reactor (21) which they enter at point (30). In case the second fluidized-bed reactor (21) is operated in condensing mode it might be advisable to branches off line (20) from the recycle gas line (25) upstream of the heat exchanger (27) to avoid that liquid enters line (20).

Figure 2:
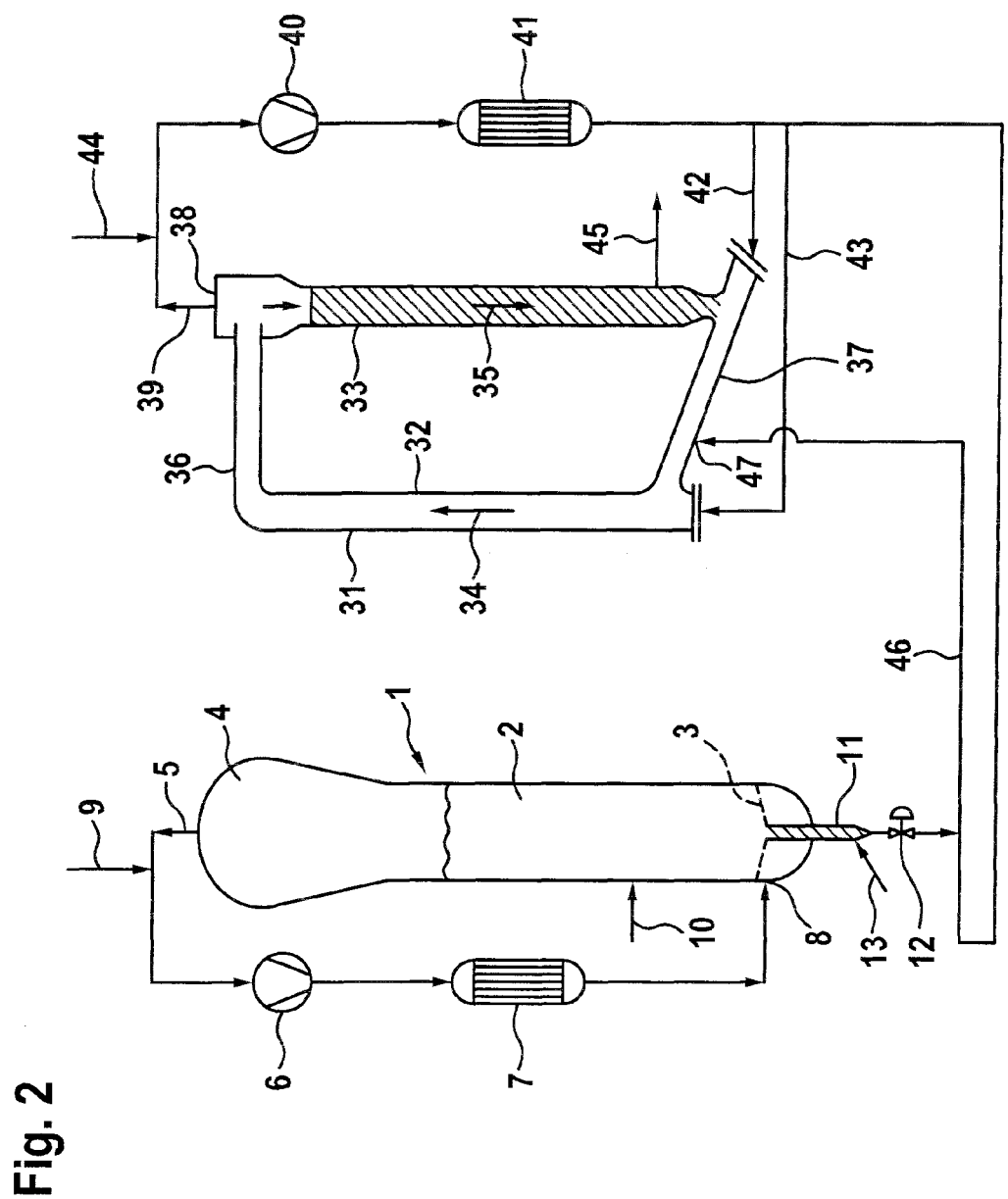

FIG. 2 shows schematically a set-up of two serially connected gas-phase reactors for carrying out the process of the present invention in which the first gas-phase reactor is a fluidized-bed reactor and the second gas-phase reactor is a circulating gas-phase reactor with two interconnected reaction zones as described in WO 97/04015 A1 or WO 00/02929 A1.

The first gas-phase reactor is a fluidized-bed reactor (1) identical to the one shown in FIG. 1 and described above.

The second gas-phase reactor is a circulating gas-phase reactor (31) with two reaction zones, riser (32) and downcomer (33), which are repeatedly passed by the polyolefin particles. Within riser (32), the polyolefin particles flow upward under fast fluidization conditions along the direction of arrow (34). Within downcomer (33) the polyolefin particles flow downward under the action of gravity along the direction of arrow (35).

The riser (32) and the downcomer (33) are appropriately interconnected by the interconnection bends (36) and (37). After flowing through the riser (32), the polyolefin particles and the gaseous mixture leave the riser (32) and are conveyed to a solid/gas separation zone (38). This solid/gas separation can be effected by using conventional separation means such as, for example, a centrifugal separator like a cyclone. From the separation zone (38) the polyolefin particles enter the downcomer (33).

The gaseous mixture leaving the separation zone (38) is recycled to the riser (32) by means of a recycle line (39), equipped with a compressor (40) and a heat exchanger (41). Downstream the heat exchanger (41) the recycle line (39) splits and the gaseous mixture is divided into two separated streams: line (42) conveys a part of the recycle gas into the interconnection bend (37), while the line (43) conveys another part the recycle gas to the bottom of the riser (32), so as to establish fast fluidization conditions therein.

Make-up monomers, make-up monomers, and optionally inert gases can be fed to the circulating gas-phase reactor (31) through one or more lines (44), suitably placed at any point of the gas recycle line (39), according to the knowledge of the skilled person in art. The obtained polyolefin particles are continuously discharged from the bottom part of downcomer (33) via a discharge line (45).

Discharge valve (12) is arranged above a line (46) which branches off the recycle gas line (39) downstream of heat exchanger (41) or branches of lines (42) or (43). Line (46) carries a further part of the recycle gas of circulating gas-phase reactor (31). The polyolefin particles having passed discharge valve (12) enter the line (46) and are transported to the circulating gas-phase reactor (31) which they enter at point (47).

The present invention further refers to a process for polymerizing olefins at temperatures of from 30° C. to 140° C. and pressures of from 1.0 MPa to 10 MPa in the presence of a polymerization catalyst in a multistage polymerization of olefins in at least two serially connected gas-phase polymerization reactors, wherein the process for transferring polyolefin particles from a first gas-phase polymerization reactor to a second gas-phase polymerization reactor is carried out as described above.

Another aspect of the present invention is a reactor for polymerizing olefins in a fluidized bed of polyolefin particles comprising a gas distribution grid, a velocity reduction zone and recycle gas line for transferring reaction gas from the top of the velocity reduction zone to a part of the reactor below the gas distribution grid, the recycle gas line being equipped with a compressor and a heat exchanger, wherein the reactor further comprises a settling pipe which is integrated with its upper opening into the distribution grid. The settling pipe is equipped, at the lower third of the settling pipe, preferably at a position near the lower end of the settling pipe with an inlet for introducing a fluid into the settling pipe and it is further equipped, at its lower end, with an outlet for withdrawing polyolefin particles, preferably shut off by a discharge valve. The settling pipe is preferably arranged substantially vertically. It is further preferred that the lower end of the settling pipe tapers conically. Such a reactor is especially suitable as first gas-phase reactor in an apparatus for polymerizing olefins comprising two serially connected gas-phase polymerization reactors for polymerizing olefins in a multistage polymerization. The present invention accordingly also refers to a process for discharging polyolefin particles from such a fluidized-bed reactor, wherein a fluid is introduced into the settling pipe in an amount that an upward stream of the fluid is induced in the bed of polyolefin particles above the fluid introduction point and polyolefin particles are withdrawn from the lower end of the settling pipe. Such a discharging process is not only advantageous in combination with transferring the discharged polyolefin particles to a next gas-phase reactor of a series of polymerization reactors but can also offer advantages if the discharged polyolefin particles are fed to degassing and extruding facilities. For example, if the polymerization of olefins is a copolymerization of ethylene it is possible by a discharging process according to the present invention to decrease drastically the amount of comonomer transferred to the degassing unit. This allows carrying out the polymerization process with a smaller degassing unit which can operate more economically because it requires less construction costs and has lower operating costs.

EXAMPLES

The melt flow rate $MFR_{2.16}$ was determined according to DIN EN ISO 1133:2005, condition D at a temperature of 190° C. under a load of 2.16 kg.

The density was determined according to DIN EN ISO 1183-1:2004, Method A (Immersion) with compression molded plaques of 2 mm thickness. The compression molded plaques were prepared with a defined thermal history: Pressed at 180° C., 20 MPa for 8 min with subsequent crystallization in boiling water for 30 min.

The particle size distribution was determined through the use of a Tyler Testing Sieve Shaker RX-29 Model B available from Combustion Engineering Endecott provided with a set of six sieves, according to ASTM E-11-87, of number 5, 7, 10, 18, 35, and 200 respectively.

The bulk density was determined according to DIN EN ISO 60:2000-01.

The hydrogen concentration in the second fluidized-bed reactor (21) was determined by gas chromatography.

A homopolymerization of ethylene was carried out in the presence of hydrogen as molecular weight regulator and propane as inert diluent in the first fluidized-bed reactor (1) a series of two connected fluidized-bed reactors as shown in FIG. 1. The cylindrical reaction part of the fluidized bed reactor (1) had an inner diameter of 1000 mm and a height of 3500 mm. The fluidized-bed reactor (1) was equipped with a vertically arranged settling pipe (11), which was integrated with its upper opening in the gas distribution grid (3). The settling pipe (11) had a cylindrical part with an inner diameter of 200 mm and a length 1250 mm and was then conically tapering over a length of 300 mm to the inner diameter of the discharge line of 40 mm. Propane was fed as fluid into the settling pipe (11) at a position near the lower end of the settling pipe in order to prevent the gas composition of the first fluidized-bed reactor from being carried over to the second fluidized-bed reactors. The utilized discharge valve was intermittently opening with an opening time of each times 1 s. The upper level of the fluidized bed was adjusted in a way that the mean residence time of the polyolefin particles in the first fluidized-bed reactor was always 2.0 h.

The second fluidized-bed reactor was not operated as polymerization reactor but only as take-up device for the transferred polyethylene particles and accordingly the gas-phase of the second fluidized-bed reactor was pure propane. To keep the level of the fluidized bed in the second reactor constant, the same amount of polymer was discharged from the second reactor as was transferred from the first reactor. The pressure in the second reactor was kept constant by feeding fresh propane to compensate for gas losses in connection with discharging polymer particles from the second reactor.

For carrying out the polymerization, a Ziegler catalyst was used which was prepared as described in Examples 1-6 of WO 2009/027266. The pre-polymerized solid catalyst component was then contacted with triisobutylaluminum (TIBAL) in liquid propane at 40° C. and a pressure of 2.5 MPa in a pre-contacting vessel in a weight ratio of 2 g TIBAL/g catalyst. The mean residence time of the catalyst in the pre-contacting vessel was 36 min.

Example 1

An ethylene polymerization with a production rate of 80 kg/h was carried out in the fluidized-bed reactor (1) at 80° C. and a pressure of 2.5 MPa. The composition of the reaction gas was 6.5 mol % ethylene, 19.5 mol % hydrogen and 74 mol % propane. The produced polyethylene had a melt flow rate $MFR_{2.16}$ of 140 g/10 min, a density of 0.968 g/cm$^3$. The average particle diameter of the obtained polyethylene particles was 970 μm, 0.3% of the polyethylene particles had a particle diameter of less than 180 μm and the bulk density of the obtained polyethylene particles was 0.526 g/cm$^3$.

The discharge of the polyethylene particles was carried out intermittently with 50 openings of the discharge valve per hour, thus discharging in average 1.6 kg of polyethylene particles per opening. The polyethylene particles were discharged into the second fluidized-bed reactor which had a pressure of 2.1 MPa.

Propane was fed into the settling pipe in a quantity of 18 kg/h. After two hours of operating the hydrogen concentration in the second fluidized-bed reactor (21) remained below the detection limit of 0.1 vol %. This proves that the operating conditions were adequate for preventing the reaction gas of the first fluidized-bed reactor (1) from being transferred into the second fluidized-bed reactor (21).

Example 2

An ethylene polymerization similar to the polymerization of Example 1 was carried out; however the production rate was increased to 350 kg/h.

The discharge of the polyethylene particles was carried out intermittently with 220 openings of the discharge valve per hour, thus discharging in average 1.6 kg of polyethylene particles per opening. Propane was fed into the settling pipe in a quantity of 65 kg/h.

After two hours of operating the hydrogen concentration in the second fluidized-bed reactor (21) remained below the detection limit of 0.1 vol %, proving that no reaction gas of the first fluidized-bed reactor (1) was transferred into the second fluidized-bed reactor (21).

Example 3

The ethylene polymerization of Example 2 was repeated.

The discharge of the polyethylene particles was carried out intermittently with 220 openings of the discharge valve per hour, thus discharging in average 1.6 kg of polyethylene particles per opening. Propane was fed into the settling pipe in a quantity of 50 kg/h.

After two hours of operating the hydrogen concentration in the second fluidized-bed reactor (21) remained below the detection limit of 0.1 vol %, proving that no reaction gas of the first fluidized-bed reactor (1) was transferred into the second fluidized-bed reactor (21).

Comparative Example A

The ethylene polymerization of Example 2 was repeated.

The discharge of the polyethylene particles was carried out intermittently with 120 openings of the discharge valve per hour, thus discharging in average 1.6 kg of polyethylene particles per opening. Propane was fed into the settling pipe in a quantity of 40 kg/h.

Shortly after starting transferring polyethylene particles from the first to the second fluidized-bed reactor, hydrogen could be detected in the second reactor. After one hour of operating, a hydrogen concentration of 0.5 vol % was reached showing that reaction gas of the first fluidized-bed reactor (1) was transferred into the second fluidized-bed reactor (21). Accordingly a too low amount of propane was fed into the settling pipe (11) to achieve an upward stream of propane in the bed of polyethylene particles in the settling pipe (11).

What is claimed is:

1. A process for transferring polyolefin particles from a first gas-phase polymerization reactor to a second gas-phase polymerization reactor in a multistage polymerization of olefins carried out in at least two serially connected gas-phase polymerization reactors,
   wherein the first gas-phase reactor is a fluidized-bed reactor comprising a gas distribution grid and a settling pipe, which is integrated with its upper opening into the distribution grid and contains a bed of polyolefin particles which moves from top to bottom of the settling pipe,
   the process comprising the steps of
   introducing a fluid into the settling pipe in an amount that an upward stream of the fluid is induced in the bed of polyolefin particles above the fluid introduction point;
   withdrawing polyolefin particles from the lower end of the settling pipe; and
   transferring the withdrawn polyolefin particles into the second gas-phase polymerization reactor.

2. The process for transferring polyolefin particles according to claim 1, wherein the settling pipe is arranged substantially vertically.

3. The process for transferring polyolefin particles according to claim 1, wherein the lower end of the settling pipe tapers conically.

4. The process for transferring polyolefin particles according to claim 1, wherein the bed of polyolefin particles moves as plug flow from top to bottom of the settling pipe.

5. The process for transferring polyolefin particles according to claim 1, wherein the polyolefin particles are continuously withdrawn from the settling pipe.

6. The process for transferring polyolefin particles according to claim 1, wherein the polyolefin particles withdrawn from the settling pipe are transferred into the second gas-phase polymerization reactor by means of reaction gas of the second gas-phase polymerization reactor.

7. The process for transferring polyolefin particles according to claim 1, wherein the multistage polymerization of olefins is a multistage polymerization of ethylene or ethylene and comonomer and the polymerization in the first polymerization reactor is a polymerization carried out in the presence of hydrogen.

8. The process for transferring polyolefin particles according to claim 1 wherein the fluid introduced into the settling pipe is an inert gas.

9. The process of claim 1, further comprising the step of polymerizing olefins at temperatures of from 30° C. to 140° C. and pressures of from 1.0 MPa to 10 MPa in the presence of a polymerization catalyst in the multistage polymerization of olefins in at least two serially connected gas-phase polymerization reactors.

* * * * *